(12) United States Patent
Ting et al.

(10) Patent No.: US 7,637,758 B2
(45) Date of Patent: Dec. 29, 2009

(54) ELECTRICAL CARD CONNECTOR HAVING A BASE PORTION WITH A CAM PLATE INTEGRATED WITH A GUIDE RAIL

(75) Inventors: Chien-Jen Ting, Tu-cheng (TW); Hung-Chi Yu, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/291,149

(22) Filed: Nov. 5, 2008

(65) Prior Publication Data

US 2009/0291577 A1 Nov. 26, 2009

(30) Foreign Application Priority Data

Nov. 5, 2007 (TW) .............................. 96141629 A

(51) Int. Cl.
  *H01R 13/62* (2006.01)
(52) U.S. Cl. ....................................... 439/159; 439/630
(58) Field of Classification Search ................. 439/159, 439/160, 630, 152, 157
See application file for complete search history.

(56) References Cited

U.S. PATENT DOCUMENTS

| | | | | |
|---|---|---|---|---|
| 7,147,495 B2* | 12/2006 | Kuo | ............................ | 439/159 |
| 7,150,650 B2* | 12/2006 | Kuo | ............................ | 439/607 |
| 7,189,087 B2* | 3/2007 | Taguchi | ....................... | 439/159 |
| 7,232,320 B2* | 6/2007 | Kuo | ............................ | 439/159 |
| 7,371,089 B2* | 5/2008 | Cheng | ......................... | 439/159 |
| 7,413,453 B2* | 8/2008 | Ting | ............................ | 439/159 |
| 7,445,473 B2* | 11/2008 | Chen | .......................... | 439/138 |
| 7,484,974 B2* | 2/2009 | Wu | .............................. | 439/159 |
| 2007/0249201 A1* | 10/2007 | Cheng et al. | ................. | 439/159 |
| 2007/0259546 A1* | 11/2007 | Ting | ............................ | 439/159 |

* cited by examiner

*Primary Examiner*—Hae Moon Hyeon
(74) *Attorney, Agent, or Firm*—Andrew C. Cheng; Wei Te Chung; Ming Chieh Chang

(57) ABSTRACT

An electrical connector (100) includes an insulating housing (30), a plurality of terminals (32) received in the insulating housing, an L-shaped metal shield (10), a base portion (20) and an ejector (40). The metal shield covers the insulating housing for defining a card receiving space. The base portion comprises a guide rail (21) and a cam plate (22) integral with the guide rail. A pair of arms (not labeled) extends upwardly from the cam plate to define a receiving channel (225) and the receiving channel defines a heart-shaped slot (220) at a front end thereof. The ejector is received in the receiving channel of the base portion and comprises a slider piece (41), a pin member (42) and a resilient element (43). The slider piece is being moveable to drive the pin member to move in the heart-shaped slot.

20 Claims, 4 Drawing Sheets

ELECTRICAL CARD CONNECTOR HAVING A BASE PORTION WITH A CAM PLATE INTEGRATED WITH A GUIDE RAIL

BACKGROUND OF THE INVENTION

1. Field of the Invention

The present invention relates generally to electrical card connectors, and more particularly to an electrical card connector easily and conveniently ejecting an electrical card.

2. Description of Related Arts

Electrical card connectors are widely used in computer industry for electrically connecting with inserted electrical cards which function as removable mass storage devices. In order to facilitate widespread use of electrical cards, certain standards have been developed, for example, in later of 2003, a new standard, Express Card, is published by PCMCIA (Personal Computer Memory Card International Association). This new Express Card standard has two different types, a rectangular electrical card and an L-shaped electrical card. Accordingly, two different types of electrical card connectors are provided to accommodate these two express cards. Noticeably, a rectangular electrical card connector can only accommodate a rectangular electrical card, and an L-shaped electrical card connector can accommodate two different types of electrical cards respectively. In order to insert the rectangular electrical card into the L-shaped electrical card connector correctly, the L-shaped electrical card connector usually includes a guide rail for guiding the rectangular electrical card. In order to draw the electrical card out of the electrical card connector conveniently, the electrical card connector usually has an ejector to eject the electrical card and a push-push type ejector usually has a slider, a pin member and a resilient element. Accordingly, a cam plate defining a heart-shaped slot therein is then required for mating with the ejector. Usually, the cam plate is arranged at the front part of the guide rail and keeps separated away from the guide rail. Because two of the guide rail and the cam plate are respectively designed and molding in the manufacturing, it is rather troublesome and time-consuming and meanwhile, a complicated structure can't meet with the miniaturization of the electrical product.

An electrical card connector is invented, in which the guide rail and the cam plate are integrally molded to overcome said above problem. However, the heat-shaped slot is defined in a peripheral wall of the cam plate and the ejector is ordered to locate at an outer side of the cam plate, so, the ejector is easy to jump out of the heart-shaped slot during the card's insertion/ejection, which thereby effects the card's ejection.

Hence, an improved electrical card connector is desired.

SUMMARY OF THE INVENTION

Accordingly, an object of the present invention is to provide an electrical card connector easily and conveniently ejecting an electrical card.

To achieve the above object, an electrical connector includes an insulating housing, a plurality of terminals received in the insulating housing, an L-shaped metal shield, a base portion and an ejector. The metal shield covers the insulating housing for defining a card receiving space. The base portion comprises a guide rail and a cam plate integral with the guide rail. A pair of arms extends upwardly from the cam plate to define a receiving channel and the receiving channel defines a heart-shaped slot at a front end thereof. The ejector is received in the receiving channel of the base portion and comprises a slider piece, a pin member and a resilient element. The slider piece is being moveable to drive the pin member to move in the heart-shaped slot.

Other objects, advantages and novel features of the invention will become more apparent from the following detailed description when taken in conjunction with the accompanying drawings.

DETAILED DESCRIPTION OF THE PREFERRED EMBODIMENT

Figure 1:
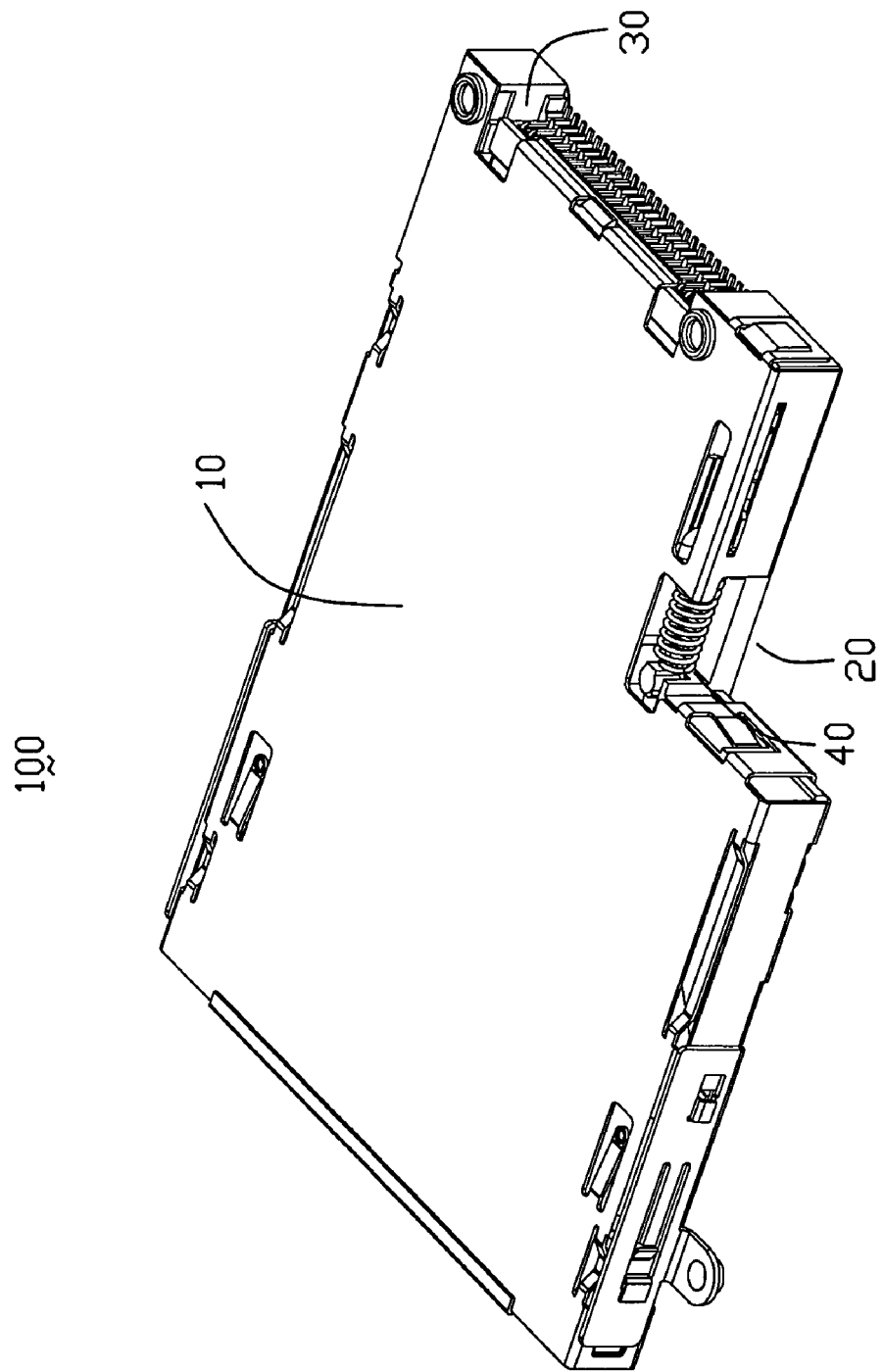
FIG. 1 is a perspective, assembled view of an electrical card connector according to the present invention.

FIGS. 1-4 illustrate an electrical card connector 100 in accordance with the present invention comprising an insulating housing 30, a plurality of terminals 32 received in the insulating housing 30, a metal shield 10, a base portion 20 and an ejector 40 received in the base portion 20. The metal shield 10 having an L-shaped configuration, shields over the insulating housing 30 for defining a card receiving space and defines a rear end (not labeled), through which an electrical card (not shown) is inserted into the card receiving space and a front end (not labeled) opposite to the rear end.

Figure 2:
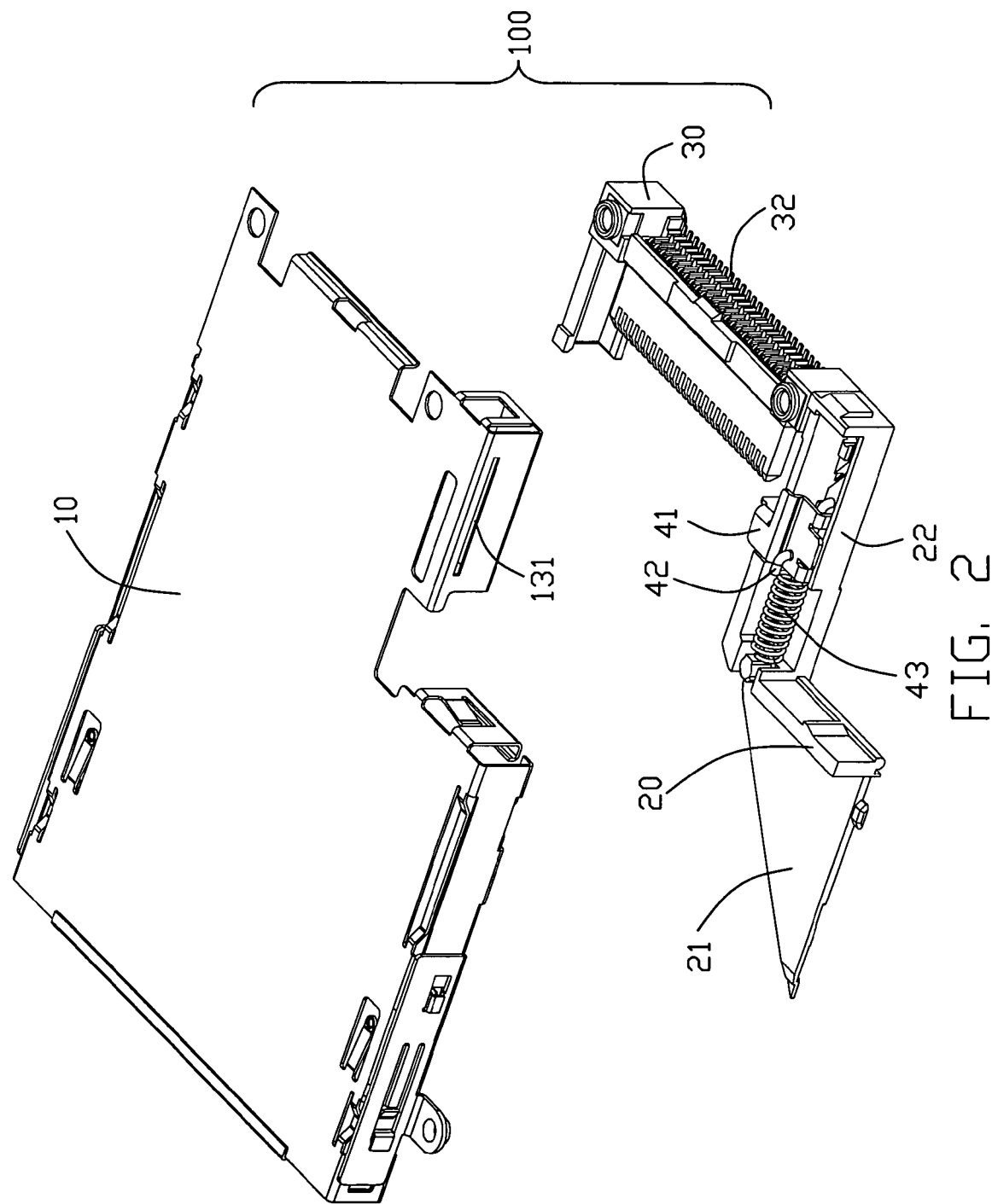
FIG. 2 is a perspective, partly exploded view of the electrical card connector.
Figure 3:
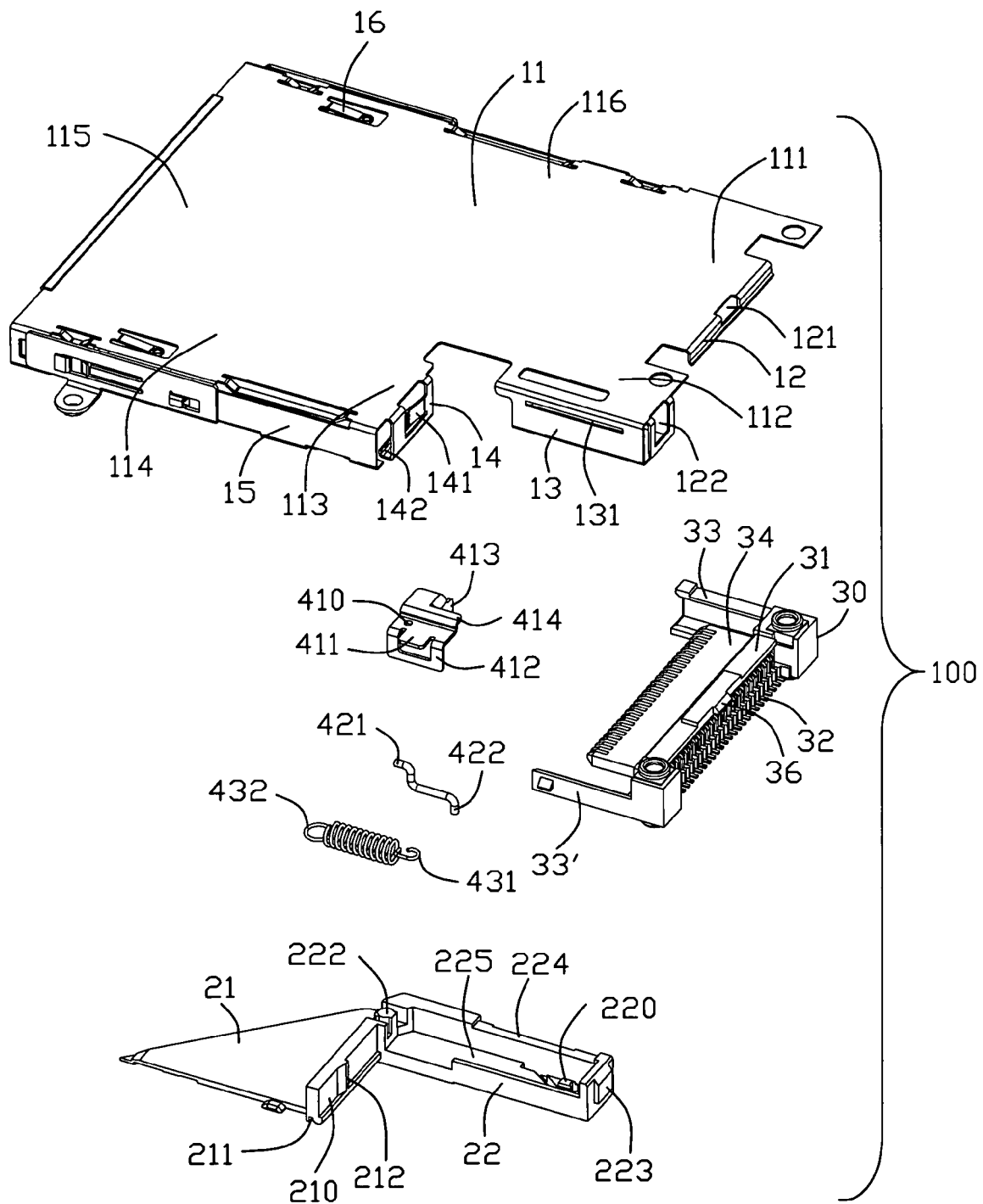
FIG. 3 is a perspective, fully exploded view of the electrical card connector.

Referring to FIGS. 2-3, the metal shield 10 is L-shaped and comprises an L-shaped main portion 11. The main portion 11 includes a first front side 111, a first lateral side 112, a second front side 113, a second lateral side 114, a rear side 115 and a third lateral side 116. The first front side 111, the second front side 113 and the rear side 115 extend along a left-to-right direction, while the first lateral side 112, the second lateral side 114 and the third lateral side 116 extend along a front-to-rear direction. The first front side 111 is served as a connection between a front portion of the first lateral side 112 and a front portion of the third lateral side 116, while the rear side 115 is served as a connection between a rear portion of the second lateral side 114 and a rear portion of the third lateral side 116. The second front side 113 has two ends respectively adjacent to a rear portion of the first lateral side 112 and a front portion of the second lateral side 114.

A barrier 12 extends downwardly from the first front side 111 to abuts against a front surface of the insulating housing 30. A connect portion between the barrier 12 and the first front side 111 defines an opening 121. An aperture 122 is defined below the first front side 111 and adjacent to the first lateral side 112. A first sidewall 13 extends downwardly from the first lateral side 112 and the first sidewall 13 defines a guiding slot 131 extending along the card insertion/ejection direction. A second sidewall 14 extends downwardly from the second front side 113 and an elastic piece 141 extends from the second sidewall 14 into the card receiving space. A fastening portion 142 extends rearward from a bottom margin of the second sidewall 14 and then continues to protrude upwardly for fastening purpose. A third sidewall 15 extends downwardly from the second lateral side 114 and a fourth sidewall (not labeled) extends downwardly from the third lateral side 116. A plurality of resilient pieces 16 are formed on the second lateral side 114 and the third lateral side 116 for ensuring close electrical connection between the electrical card and the terminals 32.

Referring to FIGS. 2 and 3, the insulating housing 30 extending along a transverse direction perpendicular to the card insertion/ejection direction, comprises a body portion 31 and a pair of shoulders 33, 33' extending backwardly from two ends of the body portion 31. A mating portion 34 also extends backwardly from the body portion 31 and is sandwiched between the pair of shoulders 33, 33' and forms a flat gradient together with the body portion 31. A plurality of terminal receiving passageways (not labeled) recess in the mating portion 34 together with the body portion 31 and receive the aligned terminals 32. The terminals 32 and the mating portion 34 altogether extend into the card receiving space and mate with the inserted electrical card electrically. A bulge 36 projects forwardly from a front wall of the body portion 31 for engaging with the opening 121 of the metal shield 10.

Referring to FIGS. 2 and 3, the ejector 40 comprises a slider piece 41, a pin member 42 and a resilient element 43. The slider piece 41 forms a horizontal plate 411, an active plate 414 extending from an inner edge of the horizontal plate 411 and forming a gradient together with the horizontal plate 411, an ejection plate 413 connecting with the active plate 414 and extending along a cross direction relative to the card insertion/ejection direction for ejecting the electrical card and a vertical plate 412 extending downwardly from an outer edge of the horizontal plate 411. Particularly, an orifice 410 is defined in the horizontal plate 411 at a rear part thereof. The pin member 42 forms two ends 421, 422, while the resilient element 43 forms a hook portion 431 and a ring portion 432. The first end 421 of the pin member 42 goes through the orifice 410 and locks with the hook portion 431 of the resilient element 43 for associating the slider piece 41, the pin member 42 with the resilient element 43.

Figure 4:
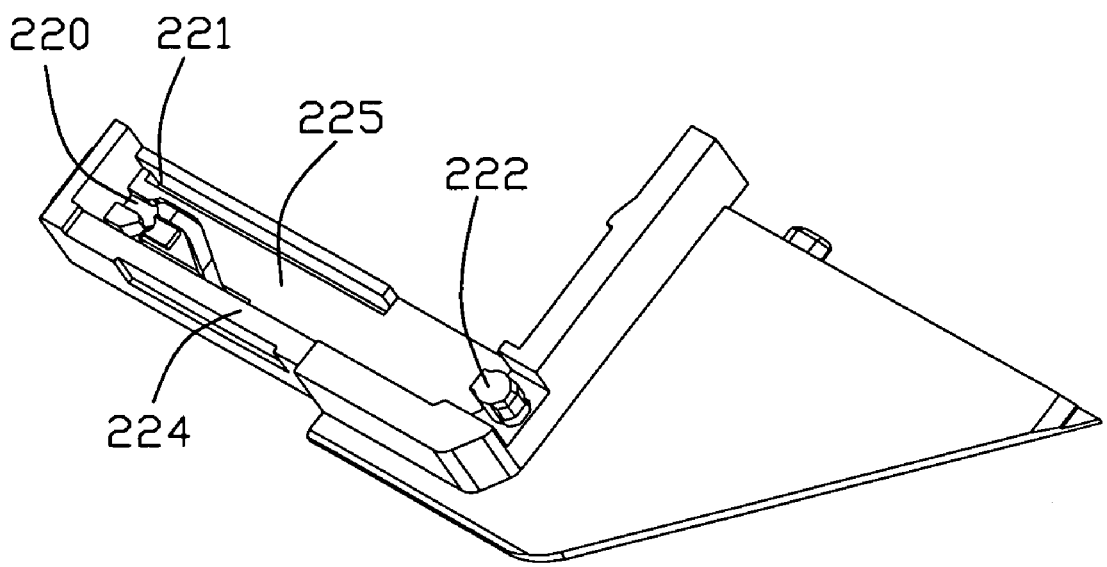
FIG. 4 is a view of the base portion of the present invention.

Referring to FIGS. 3-4, the base portion 20 comprises a guide rail 21 and a cam plate 22 extending forwardly from the guide rail 21. The guide rail 21 is approximately a triangle shape and comprises a baffle element 210 at a front edge thereof. The baffle element 210 recesses to be a slit 211 at a bottom surface thereof and forms a rib 212 protruding forwardly at a front surface thereof. The slit 211 receives the fastening portion 142 and the rib 212 is leaned against the elastic piece 141 for engagement between the metal shield 10 and the base portion 20. The cam plate 22 extends lengthways along the card insertion/ejection direction and forms an "L" shape together with the baffle element 210. At the connection of the cam plate 22 and the guide rail 21, a notch (not labeled) is excavated and a pillar element 222 is formed therein. The pillar element 222 is lassoed by the ring portion 432 of the resilient element 43 in assembly. The cam plate 22 forms a pair of arms (not labeled) thereof and thereby defines a lengthwise receiving channel 225 therebetween. A heart-shaped slot 220 is defined at a front part of the receiving channel 225. The cam plate 22 defines a moving space 224 on one of the arms, which is adjacent to the card receiving space, for confining movement of the active plate 414. The cam plate 22 further defines a recess 221 aligned with the receiving channel 225 for receiving the vertical plate 412 of the slider piece 41. A front wall (not labeled) of the cam plate 22, which connects two arms of the cam plate 22 at the front thereof, forms a protrusion 223, which protrudes into the aperture 122 of metal shield 10 for providing another engagement between the metal shield 10 and the base portion 20.

Referring to FIGS. 2-3, after assembly, the ejector 40 is received in the receiving channel 225, the horizontal plate 411, the vertical plate 412 and the active plate 414 respectively and smoothly moves in the guiding slot 131, the recess 221 and the moving space 224, the second one end 422 of the pin member 42 circularly moves in the heart-shaped slot 220 accompanying with the card's insertion/ejection. The horizontal plate 411 functions as a tab receivably moving along the guiding slot 131 of the metal shield 10. Detailed description on work process omits thereafter, for it is obvious to an ordinary skilled person in this art.

In the present invention, for the cam plate 22 extends forwardly from the guide rail 21, the guide rail 21 and the cam plate 22 are integrally molding in the manufacturing, it is time-saving and simply structured; for the cam plate 22 defines a receiving channel 225 for receiving the ejector 40, which is aligned with the card receiving space, it provides a confined room for movement of the ejector 40, so, the pin member 42 of the ejector 40 is always kept in the heart-shaped slot during the card's insertion/ejection, and accordingly, the electrical card is easily and conveniently drawn out of the electrical card connector when it is necessary.

While a preferred embodiment in accordance with the present invention has been shown and described, equivalent modifications and changes known to persons skilled in the art according to the spirit of the present invention are considered within the scope of the present invention as described in the appended claims.

We claim:

1. An electrical card connector comprising:
an insulating housing;
a plurality of terminals received in the insulating housing;
an L-shaped metal shield covering the insulating housing for defining a card receiving space;
a base portion comprising a triangle-shaped guide rail and a cam plate integral with the guide rail, a pair of arms being formed on the cam plate and extending upwardly to define a receiving channel, the receiving channel defining a heart-shaped slot at a front end thereof; and
an ejector received in the receiving channel and comprising a slider piece, a pin member and a resilient element, the slider piece being moveable to drive the pin member to move in the heart-shaped slot.

2. The electrical card connector as described in claim 1, wherein the slider piece comprises a horizontal plate, an active plate extending from an inner edge of the horizontal plate, an ejection plate connecting with the active plate along a cross direction relative to the card insertion/ejection direction and a vertical plate extending downwardly from an outer edge of the horizontal plate.

3. The electrical card connector as described in claim 2, wherein the cam plate defines a space on one of the arms which confines movement of the active plate.

4. The electrical card connector as described in claim 3, wherein the cam plate defines a recess aligned with the receiving channel and receives the vertical plate of the slider piece.

5. The electrical card connector as described in claim 2, wherein the metal shield comprises an L-shaped main portion and the main portion forms a first front side, a first lateral side, a second front side, a second lateral side, a rear side and a third lateral side, the first front side, the second front side and the rear side extending along a left-to-right direction, the first lateral side, the second lateral side and the third lateral side extending along a front-to-rear direction.

6. The electrical card connector as described in claim 5, wherein the metal shield forms a first sidewall extending downwardly from the first lateral side and the first sidewall defines a guiding slot extending along the card insertion/ejection direction.

7. The electrical card connector as described in claim 6, wherein the horizontal plate smoothly moves in the guiding slot.

8. The electrical card connector as described in claim 2, wherein the horizontal plate defines an orifice, the resilient element forms a hook portion and one end of the pin member goes through the orifice and locks with the hook portion to associate the slider piece, the pin member and the resilient element.

9. The electrical card connector as described in claim 8, wherein the base portion forms a pillar element at a connection between the cam plate and the guide rail and the resilient element forms a ring portion wrapping around the pillar element.

10. The electrical card connector as described in claim 5, wherein the guide rail forms a baffle element at a front edge thereof and the baffle forms an "L" together with the cam plate.

11. The electrical card connector as described in claim 10, wherein the metal shield comprises a second sidewall extending downwardly from the second front side which forms a fastening portion, and the baffle element defines a slot to receive the fastening portion for assembling purpose.

12. The electrical card connector as described in claim 11, wherein the second sidewall forms an elastic piece and the baffle forms a rib leaned against the elastic piece.

13. The electrical card connector as described in claim 5, wherein an aperture is defined adjacent to the front side, and a front wall of the cam plate connecting two arms of the cam plate forms a protrusion protruding into the aperture of metal shield.

14. The electrical card connector as described in claim 1, wherein the insulating housing comprises a body portion and a pair of shoulders extending backwardly from two ends of the body portion and the body portion extends along a transverse direction perpendicular to the card insertion/ejection direction.

15. The electrical card connector as described in claim 14, wherein one of the arms and one of the shoulders are arranged side by side.

16. The electrical card connector as described in claim 14, wherein the insulating housing comprises a mating portion extending backwardly from the body portion and is sandwiched between the pair of shoulders.

17. The electrical card connector as described in claim 16, wherein a plurality of terminal receiving passageways are recessed in the mating portion and receive the terminals.

18. An electrical card connector comprising:
an insulative housing having a plurality of contacts disposed therein;
an insulative base portion defining a cam plate with a heart-shaped groove therein;
a metallic shell assembling said housing and said base portion together, and cooperating with said housing and said base portion to define a card receiving space;
a metallic slider moveable along said cam plate in a front-to-back direction and including an ejection section extending into the card receiving space;
a metallic pin attached to the slider with one end retainably movable along
the heart-shaped groove; and
an extension type spring having one end linked to one of said slider and said pin, and the other end linked to one of said base portion and said shell;
wherein the slider is engaged by said shell to be ensured without tilting during moving along said front-to-back direction.

19. The electrical card connector as claimed in claim 18, wherein said slider defines a tab receivably moving along a slot defined in the shell.

20. An electrical card connector comprising:
an insulative housing having a plurality of contacts disposed therein;
an insulative base portion defining a cam plate with a heart-shaped groove therein;
a metallic shell assembling said housing and said base portion together, and cooperating with said housing and said base portion to define a card receiving space;
a metallic slider moveable along said cam plate in a front-to-back direction and including an ejection section extending into the card receiving space;
a metallic pin attached to the slider with one end retainably movable along
the heart-shaped groove; and
an extension type spring having one end linked to one of said slider and said pin, and the other end linked to one of said base portion and said shell; wherein
said slider defines a tab receivably moving along a slot defined in the shell.

* * * * *